R. W. LEACH.
FOCUSING HOOD FOR CAMERAS.
APPLICATION FILED AUG. 26, 1916.
1,263,684.
Patented Apr. 23, 1918.
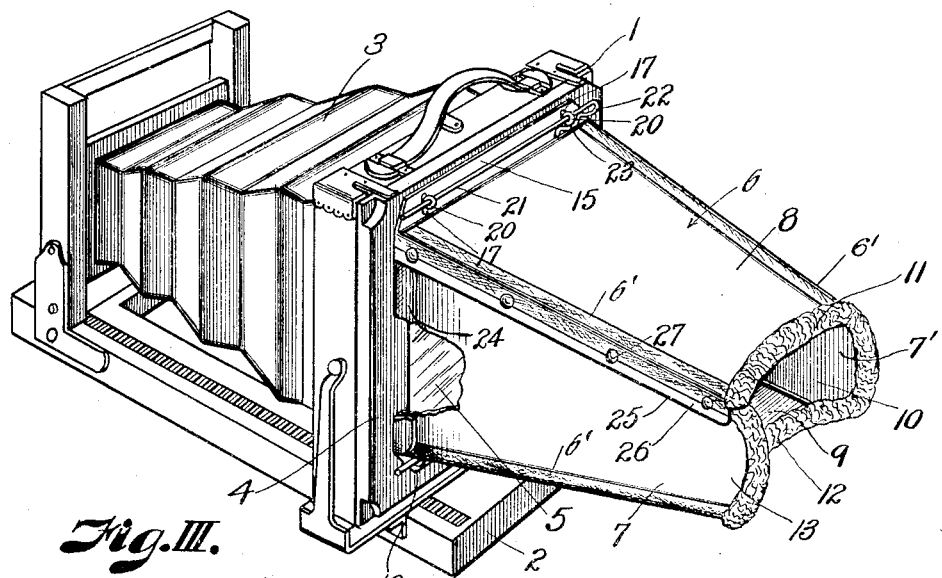
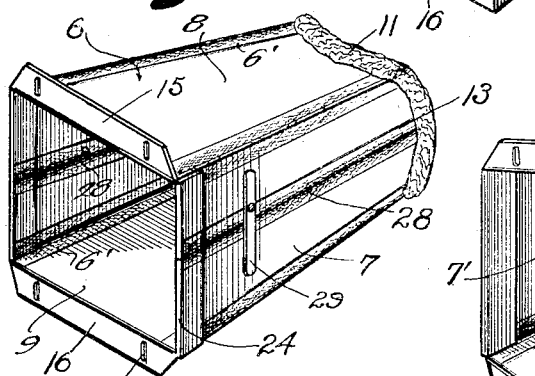
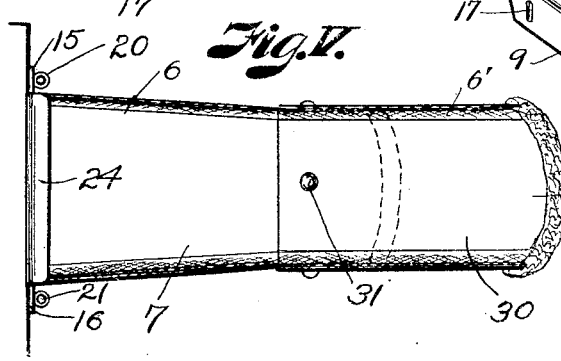
INVENTOR.
Robert W. Leach.
BY
ATTORNEY.

UNITED STATES PATENT OFFICE.

ROBERT W. LEACH, OF KANSAS CITY, MISSOURI.

FOCUSING-HOOD FOR CAMERAS.

1,263,684. Specification of Letters Patent. Patented Apr. 23, 1918.

Application filed August 26, 1916. Serial No. 117,052.

*To all whom it may concern:*

Be it known that I, ROBERT W. LEACH, a citizen of the United States, residing at Kansas City, in the county of Jackson and State of Missouri, have invented certain new and useful Improvements in Focusing-Hoods for Cameras; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a focusing hood for cameras, and has for its principal object to provide a device of this character that may be easily and quickly attached to, or removed from a camera frame, and which will effectively exclude light from the focusing plate, so that an image projected thereon through the camera lens may be more clearly observed, and a photographer may more readily adjust the lens to a proper focusing distance.

A further object of the invention is to so construct the device that after being detached from the camera frame, it may be folded to occupy a small space and may be more easily packed and handled.

To those familiar with the art of photography it is known that before exposing a negative, the photographer determines the proper forcusing distance by projecting the image of the object to be photographed on a focusing plate and adjusts the focusing bellows inwardly or outwardly until a clear cut image is produced. But in order that the image may be observed it is necessary that light be excluded from the focusing plate.

It is common practice of photographers, for the purpose of darkening the focusing plate, to use a large cloth which may be draped over the camera and the head of the photographer, which sufficiently darkens the focusing plate that the image may be seen, but such a method does not give entire satisfaction as the cloth is easily blown about, is inconvenient and does not effectively exclude the light from the focusing plate.

Therefore, with the object of providing a hood that will eliminate defects of the cloth hood and which will be held rigidly in proper position when needed, together with other objects of the invention I have provided a hood having improved details of structure the preferred forms of which are illustrated in the accompanying drawings, wherein:—

Figure I is a perspective view of a camera provided with a focusing hood embodying my invention.

Fig. II is a perspective view of a hood illustrating the detachable corner members for facilitating folding of the parts together.

Fig. III is a perspective view of a collapsible hood not having the corner opening.

Fig. IV is a detail sectional view of a corner of the hood illustrating the flexible connection of the inclosing walls.

Fig. V is a view of a focusing hood having an extension attached thereto.

Referring more in detail to the drawings:—

1 designates a camera of an ordinary type used in landscape or portrait photography, comprising a base frame 2, which may be mounted on a tripod or other suitable support (not shown), a focusing bellows 3 and a plate frame 4; the frame 4 containing an inset focusing plate 5 on which the images of objects photographed are projected for focusing purposes.

Removably mounted on the frame 4 and inclosing the focusing plate 5 is a focusing hood 6 constructed according to my invention, which comprises housing walls preferably of card board or other suitable material and having a cloth binding 6′; the side inclosing walls 7—7′ and the top and bottom walls 8—9 being flexibly joined at adjacent edges by the cloth binding 6′ to permit folding of the parts together and each of the walls is tapered toward its outer end, so that a somewhat restricted sight opening 10 is formed through which the image focused on the plate 5 may be observed.

In order to adapt the opening 10 to the face of the user, the upper and lower walls are cut out to provide concave ends 11—12 and the side walls provided with extended ends 13 which conform closely to the face of the user, so that light is excluded from within the hood.

As a means of attaching the hood to the camera frame I provide two of the opposite hood walls, preferably the upper and lower walls 7—8 with out-turned flanges or extensions 15—16 and provide the same adjacent the ends with apertures or slots 17 through which eyelets 20, which are mounted in the frame 4 are projected, and after seating the eyelets within the apertures, locking pins 21 are projected through the eyelets to secure the hood flanges tightly against the frame; the said pins being provided at one end with back turned spring arms 22 having end seats 23 for seating over the eyelets to yieldingly hold the pins in place.

Overlying the inner edges of the side walls are felt strips 24, which seat firmly against the frame when the hood is in place, and exclude light from entering, the upper edges being held tightly against the frame by the pins overlying the hood flanges.

In order to permit folding of the hood when the latter is removed from the camera frame, so that it may be conveniently stored or packed, I connect the inclosing walls at their adjacent edges as before mentioned by the flexible cloth binding, or by other flexible material and disconnect adjacent walls along one of the corners as at 25, by providing the upper wall with an extended portion 26, which may overlie the adjacent wall 7 and which are provided with snap buttons 27 whereby the two may be jointed together.

In Fig. III I have shown a hood similar to the first form described, except that no corner opening is provided, the hood walls being so connected by the flexible binding that they may be folded without injury. I also provide the side walls 7—7' with longitudinally extending joints 28, so that the side walls may be broken inwardly and the parts folded together in a very small space. I also provide braces 29 which are pivotally attached to the side walls and which will hold the same erect when turned in a transverse position across the joint, but when turned parallel therewith will permit the walls to collapse.

For the convenience of far sighted people I also provide a hood extension 30, which may be slipped over the end of the hood 6 and attached thereto by snap buttons or the like 31; the extension being similar in construction to the main hood, except that it is not tapered and may or may not have the detachable corner parts.

Assuming the device to be so constructed and the eyelets mounted in the frame, the hood is mounted by projecting the apertured flanges over the said eyelets and inserting the locking pins.

The photographer may then observe the image on the focusing plate through the hood opening 10 and may readily adjust the parts to the proper focusing distance.

After the exposure has been made the hood may be removed from the frame by drawing out the pins to release the hood flanges and permit the removal of the same from the eyelets. When the hood has been removed after unfastening the corner portions, it may be folded and conveniently packed or stored.

It is apparent that devices of this character may be made to fit cameras of various sizes and light may be effectively excluded from the focusing plate thereby, and that a convenient, inexpensive and serviceable hood is provided.

Having thus described my invention what I claim as new therein and desire to secure by Letters-Patent, is:—

The combination with a camera comprising a frame containing a focusing plate and eyelets mounted in the frame at opposite edges of the plate, of a hood adapted for inclosing the said plate, and comprising flexibly joined walls, opposite walls of said hood having out-turned flanges at their inner ends provided with apertures for receiving said eyelets and locking pins extended through said eyelets, for the purpose set forth.

In testimony whereof I affix my signature.

ROBERT W. LEACH.

Copies of this patent may be obtained for five cents each, by addressing the "Commissioner of Patents, Washington, D. C."